US011715460B2

(12) United States Patent
Khoury et al.

(10) Patent No.: US 11,715,460 B2
(45) Date of Patent: Aug. 1, 2023

(54) Z-VECTORS: SPEAKER EMBEDDINGS FROM RAW AUDIO USING SINCNET, EXTENDED CNN ARCHITECTURE AND IN-NETWORK AUGMENTATION TECHNIQUES

(71) Applicant: PINDROP SECURITY, INC., Atlanta, GA (US)

(72) Inventors: Elie Khoury, Atlanta, GA (US); Ganesh Sivaraman, Atlanta, GA (US); Tianxiang Chen, Atlanta, GA (US); Amruta Vidwans, Atlanta, GA (US)

(73) Assignee: PINDROP SECURITY, INC., Atlanta, GA (US)

( * ) Notice: Subject to any disclaimer, the term of this patent is extended or adjusted under 35 U.S.C. 154(b) by 0 days.

(21) Appl. No.: 17/066,210

(22) Filed: Oct. 8, 2020

(65) Prior Publication Data

US 2021/0110813 A1    Apr. 15, 2021

Related U.S. Application Data

(60) Provisional application No. 62/914,182, filed on Oct. 11, 2019.

(51) Int. Cl.
| | |
|---|---|
| *G10L 15/16* | (2006.01) |
| *G10L 25/51* | (2013.01) |
| *G10L 17/04* | (2013.01) |
| *G10L 15/06* | (2013.01) |

(52) U.S. Cl.
CPC ............ *G10L 15/16* (2013.01); *G10L 15/063* (2013.01); *G10L 17/04* (2013.01); *G10L 25/51* (2013.01)

(58) Field of Classification Search
CPC ....... G10L 15/16; G10L 15/063; G10L 17/04; G10L 25/51
See application file for complete search history.

(56) References Cited

U.S. PATENT DOCUMENTS

| | | | |
|---|---|---|---|
| 9,401,148 B2 * | 7/2016 | Lei | .......................... G10L 17/18 |
| 11,081,115 B2 * | 8/2021 | Lesso | ...................... G10L 25/78 |

(Continued)

FOREIGN PATENT DOCUMENTS

WO    WO-2019/109336 A1    6/2019

OTHER PUBLICATIONS

Park et al., "SpecAugment: A Simple Data Augmentation Method for Automatic Speech Recognition," Jul. 23, 2019, arXiv: 1904.08779v2 [eess.AS], https://doi.org/10.48550/arXiv.1904.08779 (Year: 2019).*

(Continued)

*Primary Examiner* — Michelle M Koeth
(74) *Attorney, Agent, or Firm* — Foley & Lardner LLP

(57) ABSTRACT

Described herein are systems and methods for improved audio analysis using a computer-executed neural network having one or more in-network data augmentation layers. The systems described herein help ease or avoid unwanted strain on computing resources by employing the data augmentation techniques within the layers of the neural network. The in-network data augmentation layers will produce various types of simulated audio data when the computer applies the neural network on an inputted audio signal during a training phase, enrollment phase, and/or testing phase. Subsequent layers of the neural network (e.g., convolutional layer, pooling layer, data augmentation layer) ingest the simulated audio data and the inputted audio signal and perform various operations.

20 Claims, 3 Drawing Sheets

(56) References Cited

U.S. PATENT DOCUMENTS

| | | | |
|---|---|---|---|
| 2014/0244257 A1 | 8/2014 | Colibro et al. | |
| 2017/0200092 A1* | 7/2017 | Kisilev | G06N 20/00 |
| 2018/0082691 A1 | 3/2018 | Khoury et al. | |
| 2018/0082692 A1* | 3/2018 | Khoury | G10L 17/02 |
| 2018/0197548 A1 | 7/2018 | Palakodety et al. | |
| 2018/0226079 A1 | 8/2018 | Khoury et al. | |
| 2018/0336880 A1* | 11/2018 | Arik | G10L 15/063 |
| 2021/0035563 A1* | 2/2021 | Cartwright | G10L 15/16 |

OTHER PUBLICATIONS

Li et al., "Deep learning based adaptive sequential data augmentation technique for the optical network traffic synthesis," Optics Express, vol. 27, No. 13/24, Jun. 20, 2019. (Year: 2019).*

Hostetler, "Toward Runtime-Throttleable Neural Networks," arXiv:1905.13179v1, May 30, 2019 (accessible at https://doi.org/10.48550/arXiv.1905.13179). (Year: 2019).*

International Search Report and Written Opinion Of The International Searching Authority issued in International Application No. PCT/US2020/054825 dated Jan. 28, 2021.

International Preliminary Report on PCT/US2020/054825 dated Apr. 12, 2022 (8 pages).

Examination Report 1—IP Australia on application No. 2020363882 dated Jan. 20, 2023 (4 pages).

Examiner's Report on CA App. 3154309 dated Apr. 5, 2023 (3 pages).

European Patent Office Search Report on EPO Application 20874571.1 dated May 4, 2023 (8 pages).

* cited by examiner

Z-VECTORS: SPEAKER EMBEDDINGS FROM RAW AUDIO USING SINCNET, EXTENDED CNN ARCHITECTURE AND IN-NETWORK AUGMENTATION TECHNIQUES

CROSS-REFERENCE TO RELATED APPLICATIONS

This application claims priority to U.S. Provisional Application No. 62/914,182, filed Oct. 11, 2019, which is incorporated by reference in its entirety.

TECHNICAL FIELD

This application generally relates to systems and methods for training and deploying an audio processing neural network.

BACKGROUND

The performance of audio processing using neural networks—such as convolutional neural networks (CNNs), deep neural networks (DNNs), and the like, is greatly improved by training the neural network to cope with noise, distortions, or other changes to inputted audio data. One tool for building robust neural networks is data augmentation, which alters certain portions of data and then added to the original training set, resulting in an augmented training dataset. Trained neural network is less susceptible to problems in the audio data.

Conventional approaches to data augmentation produce massive amounts of data because the multiple versions or copies of each audio sample are generated to create a large training dataset. The result is a dataset that is often terabytes in size. In addition, the massive dataset is still fed into the neural network one or more times. Consequently, training the neural network becomes resource-intensive process as machines churn through the massive dataset. For many entities or people, the resource limitations yield a practical limitation on the neural network's quality and operations.

SUMMARY

What is therefore desired is way to reap the benefits of data augmentation when training neural networks, without the need for massive datasets containing multiple copies of augmented data for each training speech sample.

Embodiments herein describe systems and methods of using a neural network comprising in-network data augmentation layers. The in-network augmentation layers apply the various augmentation operations in-network when an audio signal is ingested, rather than producing and ingesting multiple copies or segments of the audio signals for each of the various types of data augmentation operations.

In one embodiment, a computer-implemented method comprises training, by a computer, a neural network comprising one or more in-network augmentation layers by applying the neural network on a plurality of training audio signals; generating, by the computer, an enrollment vector for an enrollee by applying the neural network on a plurality of enrollment audio signals of the enrollee; receiving, by the computer, a test input audio signal of a speaker; generating, by the computer, a speaker vector for the speaker by applying the neural network on the test audio signal; and generating, by the computer, a likelihood score for the speaker indicating a likelihood that the speaker is the enrollee based upon the speaker vector and the enrollee vector.

In another embodiment, a system comprises a computer comprising a processor and a non-transitory computer readable medium having instructions that when executed by the processor are configured to train a neural network comprising one or more in-network augmentation layers by applying the neural network on a plurality of training audio signals; generate an enrollment vector for an enrollee by applying the neural network on a plurality of enrollment audio signals of the enrollee; receive a test input audio signal of a speaker; generate a speaker vector for the speaker by applying the neural network on the test audio signal; and generate a likelihood score for the speaker indicating a likelihood that the speaker is the enrollee based upon the speaker vector and the enrollee vector.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
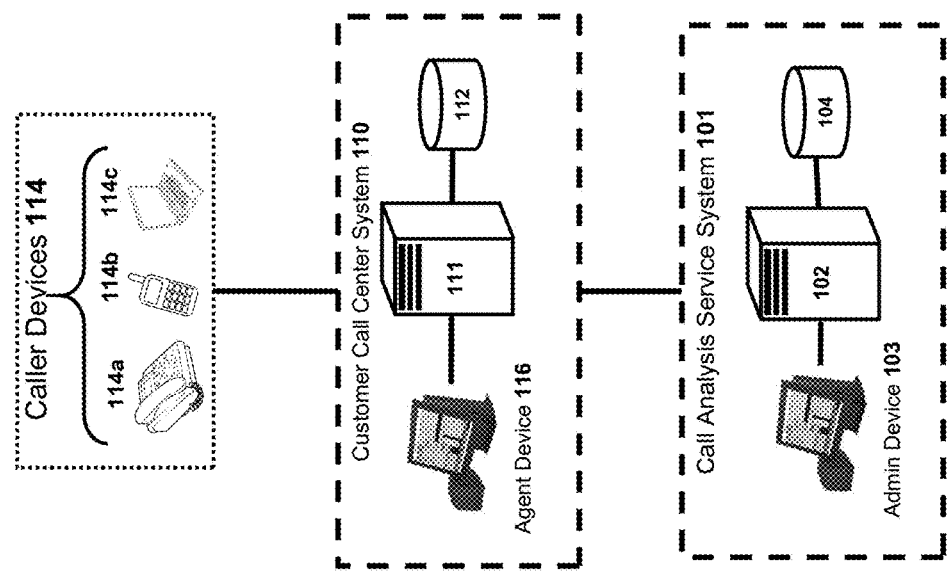
FIG. 1 shows components of a system for receiving and analyzing telephone calls, according to an illustrative embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Described herein are systems and methods for improved audio analysis using a computer-executed neural network having one or more in-network data augmentation layers. Conventional data augmentation approaches frequently generated and ultimately relied upon massive amounts of augmented datasets for training neural networks. The systems described herein help to ease or avoid unwanted strain on computing resources by employing the data augmentation techniques within the layers of the neural network. The in-network data augmentation layers can produce various types of simulated audio data when the computer applies the neural network on an inputted audio signal during a training phase, enrollment phase, and/or deployment phase (sometimes called "testing"). Subsequent layers of the neural network (e.g., convolutional layer, pooling layer, data augmentation layer) ingest the simulated audio data and the inputted audio signal and perform various operations. This in-network approach to data augmentation advantageously mitigates or potentially eliminates the need to produce or store large datasets of simulated audio data for training or testing the neural network.

Data augmentation techniques generate simulated audio signals intended to mimic the effects of various types of degradation, distortion, or other conditions affecting an audio signal. Data augmentation layers generate simulated data or manipulate the extracted features of the audio signal, such that the neural network considers various edge cases of possible types of degradation or other conditions affecting the waveform carrying the audio signal. The training audio signals include speech samples with known or expected speech portions, which a classification layer uses to adjust the hyper-parameters of the neural network to mitigate the error and converge the results produced on training signals with the expected results. The in-network augmentation layers applied during the training and enrollment phases produce a robust neural network that is resistant to the various types of degradation, but without having to generate terabytes of data.

The in-network augmentation layers of the embodiments described herein include an audio clipping layer, a noise augmentation layer, a frequency augmentation layer, and a duration augmentation layer, each configured to employ a corresponding data augmentation technique on the audio data of the input audio signal. Embodiments are not limited to only such in-network augmentation layers or data augmentation techniques. The computing device selectively applies some or all of the in-network augmentation layers during ordinary operational phases of the neural network (e.g., training phase, enrollment phase, deployment phase). For instance, the computing device may disable the duration augmentation layer during the training phase but enable each in-network augmentation layer during the deployment phase.

Embodiments may employ any number of combinations regarding enabling and disabling the in-network augmentation layers. The computing device executing the neural network enables or disables the in-network augmentation layers according to predetermined configurations. A user (e.g., system administrator) establishes the predetermined configurations according to the particular implementation demands of the neural network and downstream operations that employ the outputs of the neural network. Non-limiting examples of downstream operations and/or the potential uses of the neural network architecture described herein include speech recognition, audio event detection, voice activity detection (VAD), speech activity detection (SAD), voice spoofing detection, speaker identification, speaker authentication, speaker verification, speaker diarization, and degradation mitigation, among others.

A. Components and Operations of an Illustrative System

FIG. 1 shows components of a system 100 for receiving and analyzing telephone calls, according to an illustrative embodiment. The system 100 comprises a call analytics system 101, call center systems 110 of customer enterprises (e.g., companies, government entities, universities), and caller devices 114 (e.g., landline phone 114a, mobile phone 114b, caller computing device 114c). The call analytics system 101 includes analytics servers 102, analytics databases 104, and admin devices 103. The call center system 110 includes call center servers 111, call center databases 112, and agent devices 116. Embodiments may comprise additional or alternative components or omit certain components from those of FIG. 1, and still fall within the scope of this disclosure. It may be common, for example, to include multiple call center systems 110 or for the call analytics system 101 to have multiple analytics servers 102. Embodiments may include or otherwise implement any number of devices capable of performing the various features and tasks described herein. For example, the FIG. 1 shows the analytics server 102 in as a distinct computing device from the analytics database 104. In some embodiments, the analytics database 104 may be integrated into the analytics server 102.

Various hardware and software components of one or more public or private networks may interconnect the various components of the system 100. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the caller devices 114 may communicate with callees (e.g., call center systems 110) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as carriers, exchanges, and networks, among others.

The caller devices 114 may be any communications or computing device the caller operates to place the telephone call to the call destination (e.g., the call center system 110). Non-limiting examples of caller devices 114 may include landline phones 114a and mobile phones 114b. That the caller device 114 is not limited to telecommunications-oriented devices (e.g., telephones). As an example, the caller device 114 may include an electronic device comprising a processor and/or software, such as a caller computing device 114c or Internet of Things (IoT) device, configured to implement voice-over-IP (VoIP) telecommunications. As another example, the caller computing device 114c may be an electronic IoT device (e.g., voice assistant device, "smart device") comprising a processor and/or software capable of utilizing telecommunications features of a paired or otherwise networked device, such as a mobile phone 114b.

The call analytics system 101 and the call center system 110 represent network infrastructures 101, 110 comprising physically and logically related software and electronic devices managed or operated by various enterprise organizations. The devices of each network system infrastructure 101, 110 are configured to provide the intended services of the particular enterprise organization.

The call analytics service operates the call analytics system 101 that provides various call management, security, authentication (e.g., speaker verification), and analysis services to customer organizations (e.g., corporate call centers, government entities) that operate the call center systems 110. In operation, a caller uses a caller device 114 to originate a telephone call to the call center system 110. The caller device 114 transmits the call audio data to the call center system 110 or directly to the call analytics system 101 via components of telephony networks and carrier systems (e.g., switches, trunks), as well as by the caller devices 114. The call center system 110 may store the call audio data into a call center database 112 and transmit the call audio data to the call analytics system 101.

The analytics server 102 of the call analytics system 101 may be any computing device comprising one or more processors and software, and capable of performing the various processes and tasks described herein. The analytics server 102 may host or be in communication with the analytics database 104, and receives and processes the audio data from the one or more call center systems 110. Although FIG. 1 shows only single analytics server 102, the analytics server 102 may include any number of computing devices. In some cases, the computing devices of the analytics server 102 may perform all or sub-parts of the processes and benefits of the analytics server 102. The analytics server 102 may comprise computing devices operating in a distributed or cloud computing configuration and/or in a virtual machine configuration. It should also be appreciated that, in some embodiments, functions of the analytics server 102 may be partly or entirely performed by the computing devices of the call center system 110 (e.g., the call center server 111).

In operation, the analytics server 102 may execute various software-based processes on audio signals, such as speaker authentication, speaker diarization, and the like. The analytics server 102 executes software for a neural network with in-network data augmentation layers (e.g., audio clipping layer, noise augmentation layer, frequency augmentation layer, duration augmentation layer) that perform various data augmentation techniques on the data of inputted audio signals. The inputted audio signals may be a training audio signal, an enrollment audio signal, and a test audio signal. The analytics server 102 applies the neural network to each of the types of input audio signals during a corresponding operational phase of the neural network: training, enrollment, or deployment (sometimes referred to as "testing").

During training, the analytics server 102 receives training audio signals of various lengths and characteristics from one or more corpora, which may be stored in an analytics database 104 or other storage medium. The training audio signals include speech that the analytics server 102 trains the neural network to recognize as speech. The analytics server 102 enables the in-network augmentation layers and feeds each training signal into the neural network. The in-network augmentation layers generate additional versions or segments of the given training signal, containing manipulated data features mimicking a particular type of signal degradation or distortion. These additional versions or segments are not necessarily stored long-term store, but are applied immediately within the given in-network augmentation layer or the given training signal. The fully connected layers output a training feature vector for each of the many training audio signals and determine the level of error for the plurality of training feature vectors. The classifier layer adjusts the hyper-parameters of the neural network until the training feature vectors converge with the feature vectors expected. When training is completed, the memory of the analytics server 102 or the analytics database 104 stores the hyper-parameters. The analytics server 102 may also disable the classification layer to keep the hyper-parameters fixed.

During enrollment, an enrollee, such as an end-consumer of the call center system 110, provides several speech examples to the call analytics system 101. For example, the enrollee could respond to various interactive voice response (IVR) prompts of IVR software executed by a call center server 111. The call center server 111 then forwards the recorded responses containing the enrollment audio signals to analytics server 102. The analytics server 102 applies the neural network on each of the enrollee samples and generates corresponding enrollee feature vectors (sometimes called "embeddings"). The analytics server 102 applies each of the layers of the neural network, including the in-network augmentation layers, but disables the classification layer. The analytics server 102 generates an average or otherwise algorithmically combines the enrollee feature vectors and stores the enrollee feature vectors into the analytics database 104 or the call center database 112.

During deployment, the caller the analytics server 102 receives the test audio signal of the inbound call originated from the caller device 114. The analytics server 102 applies the neural network to determine whether the caller is an enrollee of the call center system 110 or the analytics system 101. The analytics server 102 applies each of the layers of the neural network, including the in-network augmentation layers, but disables the classification layer. The neural network generates a test feature vector for the caller and then determines a similarity score indicate the distance between the test feature vector and the enrollee feature vector. If the similarity score satisfies a predetermined threshold, then the analytics server 102 determines the caller and the enrollee are the same person. The analytics server 102 (or another device of the system 100) executes various downstream operations (e.g., speaker authentication, speaker diarization) that employ the determinations produced by the neural network at deployment time.

The analytics server 102 or layers of the neural network perform various pre-processing operations on an input audio signal. These pre-processing operations may include transforming features of the audio data from a time-domain representation to frequency-domain representation using a Fast Fourier Transform (FFT) algorithm, parsing the input audio signal into frames or sub-frames, or performing various normalization or scaling operations.

The in-network augmentation layers executed by the analytics server 102 include an audio clipping layer, a noise augmentation layer, a frequency augmentation layer, and a duration augmentation layer. Each in-network augmentation layer employs one or more corresponding data augmentation technique on the audio data of the input audio signal.

Audio Clipping

The audio clipping layer simulates instances of signal or energy clipping, where the magnitude of the input audio signal exceeds the energy or sampling capabilities of the device capturing the signal. When applying the audio clipping layer, the analytics server 102 randomly selects from a segment any random time series point of the input audio signal, at a given duration, and changes the values for that segment to an extreme energy value, which is typically −1 or 1 when the energy values are normalized or scaled.

Noise Augmentation

When applying the noise augmentation layer, the analytics server 102 randomly selects one or more noise samples from a corpus of noise samples stored in the analytics database 104. The noise augmentation layer performs one or more additive operations on the waveform of the input audio signal using a noise sample, thereby generating a simulated noise signal. Additionally or alternatively, the noise augmentation layer can generate simulated samples of multiplicative noise (e.g., reverberation), which the noise augmentation layer convolves with the input audio signal. In some cases, the neural network convolves the simulated noise samples with the results of the audio clipping layer and/or the input audio signal.

Frequency Augmentation

When applying the frequency augmentation layer, the analytics server 102 randomly selects a band of frequencies from a frequency domain representation and applies a mask (e.g., replaces values with zero) to the audio data at the selected frequencies. The frequency augmentation layer 312 may apply the frequency augmentation layer 312 one or more times to generate corresponding instances of frequency-masked audio data. The frequency augmentation layer simulates instances of poorly captured or otherwise distorted frequencies.

Duration Augmentation

Duration augmentation adds robustness against duration-mismatched enrollment and test samples. When applying the duration augmentation layer, the analytics server 102 the randomly selects one or more speech segments of a random duration from. The duration augmentation layer applies a mask to the features of the audio signal at the selected segment.

The analytics database 104 and/or the call center database 112 may contain any number of corpora of training audio signals that are accessible to the analytics server 102 via one or more networks. In some embodiments, the analytics server 102 employs supervised training to train the neural network, where the analytics database 104 includes labels associated with the training audio signals that indicate which signals contain speech portions. The analytics server 102 may also query an external database (not shown) to access a third-party corpus of training audio signals. An administrator may configure the analytics server 102 to select the speech segments to have durations that are random, random within configured limits, or predetermined at the admin device 103. The duration of the speech segments vary based upon the needs of the downstream operations and/or based upon the operational phase. For example, during training or enrollment, the analytics server 102 will likely have access to longer speech samples compared to the speech samples available during deployment. As another example, the analytics server 102 will likely have access to longer speech samples during telephony operations compared to speech samples received for voice authentication.

The call center server 111 of a call center system 110 executes software processes for managing a call queue and/or routing calls made to the call center system 110, which may include routing calls to the appropriate call center agent devices 116 based on the caller's comments. The call center server 111 can capture, query, or generate various types of information about the call, the caller, and/or the caller device 114 and forward the information to the agent device 116, where a graphical user interface (GUI) of the agent device 116 displays the information to the call center agent. The call center server 111 also transmits the information about the inbound call to the call analytics system 101 to preform various analytics processes on the inbound audio signal and any other audio data. The call center server 111 may transmit the information and the audio data based upon a preconfigured triggering conditions (e.g., receiving the inbound phone call), instructions or queries received from another device of the system 100 (e.g., agent device 116, admin device 103, analytics server 102), or as part of a batch transmitted at a regular interval or predetermined time.

The admin device 103 of the call analytics system 101 is a computing device allowing personnel of the call analytics system 101 to perform various administrative tasks or user-prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the user employs the admin device 103 to configure the operations of the various components of the call analytics system 101 or call center system 110 and to issue queries and instructions to such components.

The agent device 116 of the call center system 110 may allow agents or other users of the call center system 110 to configure operations of devices of the call center system 110. For calls made to the call center system 110, the agent device 116 receives and displays some or all of the relevant information associated with the call routed from the call center server 111.

B. Example Methods for in-Network Augmentation Layers

Figure 2:
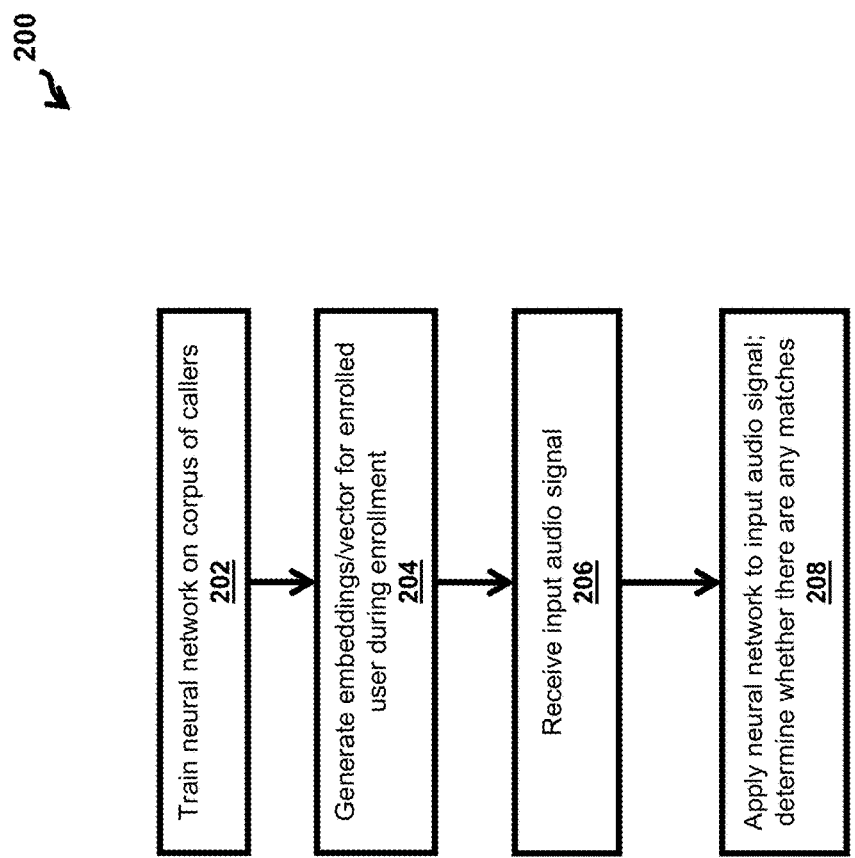
FIG. 2 shows examples steps of a method for implementing a neural network with in-network augmentation layers.

FIG. 2 shows examples steps of a method 200 for implementing a neural network with in-network augmentation layers. A server executing machine-readable software code of the neural network performs the method 200. Embodiments may include additional, fewer, or different operations than those described in the method 200 and shown in FIG. 2. It should be further appreciated that the various operations of the method 200 may be performed by one or more processors executing of any number of computing In step 202, a server places the neural network into a training operational phase. The server applies the neural network to thousands of speech samples (received as inputted audio signals) to train a classifier layer to identify, for example, speech portions of audio. The server may select training audio signals and/or randomly generate simulated audio segments, which the fully connected layer or classification layer uses to determine the level of error for training feature vectors produced by the neural network. The classifier layer adjusts the hyper-parameters of the neural network until the training feature vectors converge with the expected feature vectors. When training is completed, the memory of the server or other memory location stores the hyper-parameters. The neural network may also disable the classification layer to keep the hyper-parameters fixed.

The neural network will enable and apply one or more in-network augmentation layers to train the neural network. The in-network augmentation layers simulate edge cases for degradation or other negative impacts on each inputted audio signal (e.g., energy magnitude clipping), thereby training a robust neural network by deliberately injecting random types of distortion on the inputted audio signals. As such, the neural network does not require multiple copies of simulated versions of each input audio signal according to each type of potential distortion. Rather, the in-network augmentations layers can generate any number of simulated signals or simulated data for each inputted audio signal.

Optionally, the training phase includes two stages that vary certain characteristics of the training audio signals fed to the neural network and/or which layers are enabled. For example, during the first stage, the neural network enables each layer, except for a duration augmentation layer. The server feeds relatively short utterances (as the input audio signals), which that are, e.g., two or three seconds. Neural networks ordinarily can have trouble handling short utterances, so brief utterances are difficult training condition contributing to robustness.

During the second stage, neural network could disable training on all convolutional layers, while enabling training of the remainder of the network (e.g., fully connected layers, classification layer). The second stage uses longer utterances of, e.g., 10-60 seconds. Training the fully connected layers under ordinary conditions (e.g., longer input signals) typically produces well-trained fully connected layers.

In step 204, the server places the neural network into an enrollment operational phase. The server receives several enrollment speech samples for an enrollee and applies the neural network to generate enrollment feature vectors (sometimes called "embeddings") for the enrollee. The neural network typically applies each of the layers during enrollment, except for the classification layer. The neural network generates several enrollment feature vectors for the enrollee and generates the combined enrollment feature vector based on an average of the enrollment feature vectors or any other algorithmic technique for combining the enrollment feature vectors. The final enrollment feature vector of the enrollee is stored into memory.

The in-network augmentation layers can generate various types of distortion or degradation for each enrollment speech sample, such that the corresponding data augmentation techniques are part of, e.g., the convolutional operations that generate the enrollment feature vectors for the enrollee.

In step 206, the server enters a deployment operational phase (sometimes called "testing") and typically enables each of the layers of the neural network, except for the classification layer. The server receives an input audio signal from a speaker and feeds the input audio signal into the neural network architecture.

In some cases, the layers of the neural network may before certain pre-processing operations, such as applying a FFT algorithm to transform the audio data of the input audio signal from a time-domain representation to a frequency-domain representation. Optionally, the server performs any number of pre-processing operations before feeding the audio data into the neural network.

In step 208, during the deployment operational phase, the server applies the neural network on the input audio signal and generates a test feature vector (also referred to as a speaker vector). The server typically enables each in-network augmentation layer, except for the classification layer. The fully connected layers output the test feature vector and a similarity score indicating the distance between the test feature vector and the enrollment feature vector. The server identifies a match (or a likely match) between the speaker and the enrollee when the similarity score satisfies a threshold value. One or more downstream operations (e.g., speaker authentication, speaker diarization) can use the match determination, the similarity score, and/or the test feature vector to perform the given functions.

Example Neural Network Architecture

Figure 3:
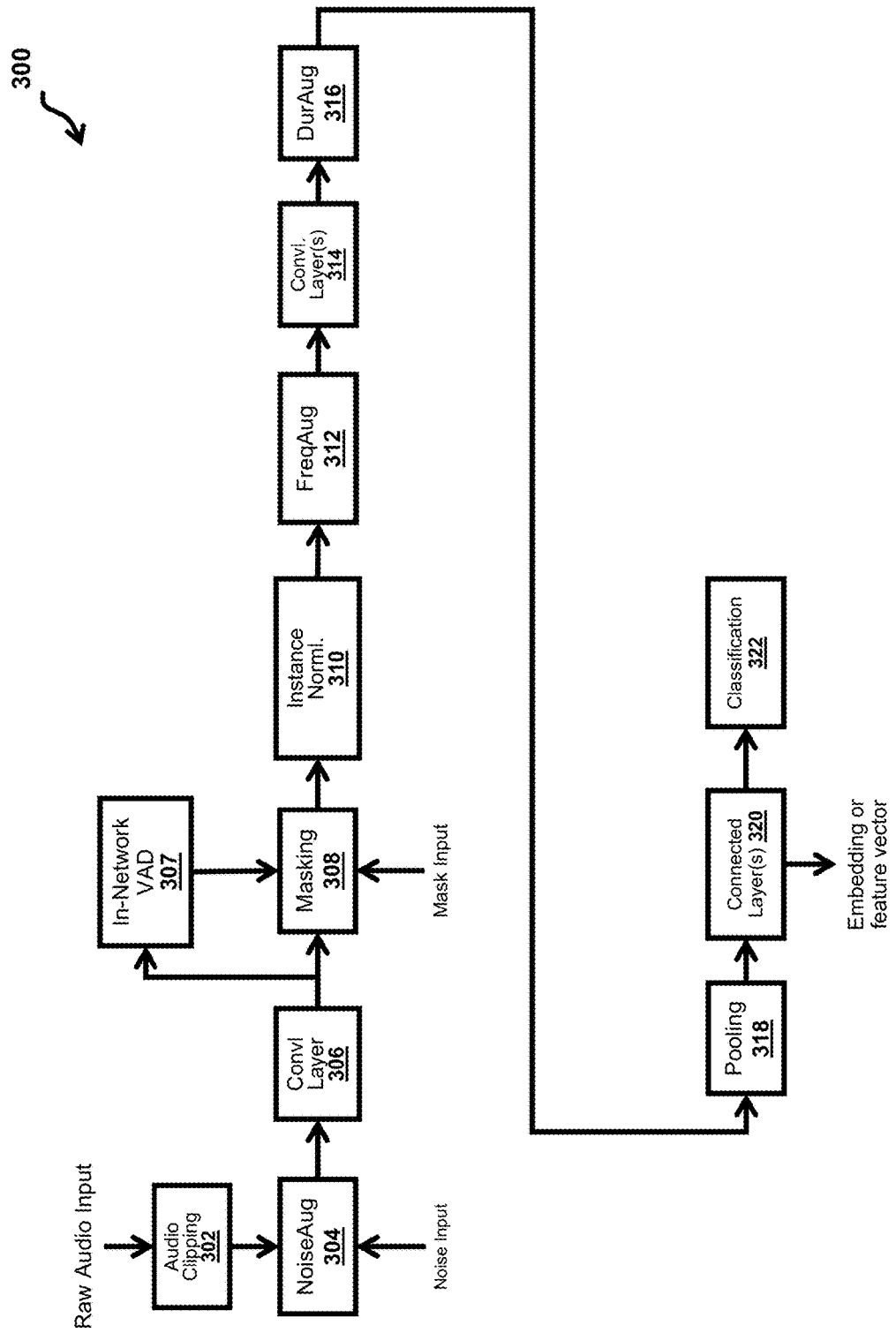
FIG. 3 shows architecture components of a neural network with in-network augmentation layers for audio signal processing, according to an embodiment.

FIG. 3 shows architecture components of a neural network 300 executed by a server (or other computer) for audio signal processing, according to an embodiment. The neural network 300 is an end-to-end system that ingests and processes audio data of an observed audio signal. The neural network 300 includes in-network augmentation layers 302, 304, 312, 316 that selectively apply data augmentation techniques on the ingested audio data during the various operational phases of the neural network 300 (e.g., training phase, enrollment phase, deployment phase). As such, the input audio signals mentioned in FIG. 3 could refer to training audio signals (e.g., clean audio signals, simulated audio signals), enrollment audio signals, or test audio signals. Embodiments may include additional or alternative operations, or may omit operations, from those shown in FIG. 3, and still fall within the scope of this disclosure. In addition, embodiments may vary the order components of the neural network 300 are executed.

As mentioned, the neural network 300 enables or disables the in-network augmentation layers 302, 304, 312, 316 based upon user configurations, as dictated by the demands of the particular use case or circumstances. Some or all of the in-network augmentation layers 302, 304, 312, 316 could be enabled or disabled during each of the operational phases according to the configurations. The server enables or disables other components of the neural network 300 according to the operational phase. For example, the server may enable a classification layer 322 during the training phase only, but then disable the classification layer 322 during the enrollment and deployment phases.

Any of the layers may be capable of performing pre-processing techniques when ingesting the input audio signal or features of the input audio signals. These pre-processing techniques may include parsing the audio data into fixed frames and overlapping sub-frames, transforming the audio data from a time-domain representation to a frequency-domain representation according to an FFT algorithm, and normalization or scaling functions. For example, certain pre-processing operations ordinarily normalize or scale the energy values to a scale having a range of $[-1, 1]$, where $-1$ is the extreme low and 1 is extreme high.

The audio clipping layer 302 performs an audio clipping technique of data augmentation on the input audio signal. The audio clipping layer 302 ingests the raw audio input signal (e.g., one or more audio recording data files, binary data stream), where the audio data of the input audio signal is represented as an amount of energy in the time-domain or the frequency-domain. The audio clipping layer 302 sets the values of one or more segments of the waveform to predetermined extreme energy magnitude values. In operation, the audio clipping layer 302 selects a segment of the input audio signal occurring at a given time and having a certain duration, where the time and/or duration may be random or based upon an input from the administrator.

As an example, the input audio signal fed into the audio clipping layer 302 contains two seconds of speech. The audio clipping layer 302 randomly selects from any random point in the two-second input audio signal a segment that is between 0 and 300 ms in duration. The audio clipping layer 302 then sets the energy values of the segment to an extreme high or low value (e.g., $-1$, 1). The audio clipping layer 302 outputs a simulated audio signal having the changes imposed on the input audio signal at the one or more clipped segments and/or the one or more clipped segments. In some cases, the clipping layer 302 may output the original input audio signal.

The noise augmentation layer 304 performs a noise augmentation technique of data augmentation. The noise augmentation layer 304 may ingest the clipped input audio signal from the audio clipping layer 302 or the original audio input audio signal from the initial data source. The noise augmentation layer 304 also ingests noise samples comprising audio recordings of sources of additive noise (e.g., background noise, ambient noise). The additive noise is included to the input audio signal according to one or more additive operations using the additive noise sample and the input audio signal. Additionally or alternatively, the noise augmentation layer 304 may generate or ingest examples of multiplicative noise (e.g., reverberation) based upon the input audio signal, which the noise augmentation layer 304 may then include to the input audio signal through one or more convolutional operations using the multiplicative noise sample and the input audio signal. The output of the noise augmentation layer 304 may be one or more simulated noise signals, derived from the original input audio signal or the clipped input audio signal.

One or more convolutional layers 306 ingest various outputs of the audio clipping layer 302 and/or the noise augmentation layer 304. For example, the convolutional layer 306 could ingest the clipped input audio signal, the input audio signal, and a plurality of simulated noise signals. In some cases, a convolutional layer 306 further ingests additional inputs from other data sources, such as server memory or a database. The convolutional layer 306 may include, for example, a 1-D convolutional layer or a SincNet layer. The convolutional layer 306 outputs the features generated to an instance normalization layer 310. In some implementations, the convolutional layer 306 may output the features generated to an optional in-network VAD layer 307 and/or an optional masking layer 308.

The optional in-network VAD layer 307 applied to the features outputted by the convolutional layer 306 detects speech portions and non-speech portions. The server may train the classifier of the in-network VAD layer 307 separately or along with the neural network 300. The VAD layer 307 may output binary results or contentious values (e.g., probabilities) for each of the windows applied to the features, indicating whether a speech portion occurs at a given window.

The neural network 300 may further apply the optional masking layer 308 to the features outputted by the convolutional layer 306 or the results of the in-network VAD layer 307 to indicate, for example, portions of the time series that may be skipped (e.g., non-speech portions) or to influence the outputs of later processes by indicating less-critical portions of the time series. In some cases, the server receives a fixed mask input from a user, server memory, or database and applies the mask to the features outputted at the convolutional layer 306. In some cases, the mask layer additionally or alternatively receives and applies the results from the VAD layer 307. The mask may be a binary mask or a soft mask.

An instance normalization layer 310 normalizes the outputs of the preceding layers. The instance normalization layer 310 determines various statistical values (e.g., mean, standard deviation) for the features and then normalizes or scales the values. Any number of normalization techniques may be applied in addition or as an alternative to instance normalization.

The frequency augmentation layer 312 ingests the normalized audio data features and, if necessary, performs an FFT operation to transform the features from a time-domain representation to a frequency-domain representation. Additionally or alternatively, the frequency augmentation layer 312 may be applied to features extracted and transformed directly from the input audio signal. In operation, the server randomly selects a band of frequencies from the frequency domain and applies a mask to the audio data at the frequencies within the selected band. The frequency augmentation layer 312 may apply the frequency augmentation layer 312 one or more times to generate corresponding instances of frequency-masked audio data.

The second convolutional layer 314 ingests and convolves the audio data features, the frequency-masked audio data, and any other additional inputs. The second convolutional layer 314 may perform any number of convolutional operations on the data. The second convolutional layer 314 outputs the resulting generated features of the audio data.

The duration augmentation layer 316 ingests the features of the audio data from the second convolutional layer 314 and applies a duration augmentation technique. Additionally or alternatively, the server applies the duration augmentation layer 316 directly on the features of the input audio signal. In operation, the duration augmentation layer 316 selects one or more speech segments of a random duration from the features audio data occurring random times. The duration augmentation layer 316 generates one or more time-masked segments for each of the selected speech segments by applying a mask to the features of the audio signal at the time and for the given duration of the given speech segment.

As mentioned, the duration of the speech segments vary based upon the needs of the downstream operations and/or based upon the operational phase. For example, during training or enrollment, the server will likely have access to longer speech samples compared to the speech samples available during deployment. As another example, the server will likely have access to longer speech samples during telephony operations compared to speech samples received for voice authentication. The duration augmentation layer 316 might mask speech segments between, e.g., 10 seconds and 60 seconds long when simulating conditions on behalf of downstream telephony operations. The duration augmentation layer 316 might mask speech segments between, e.g., 0.5 seconds and 4 seconds when simulating shorter utterances on behalf of downstream authentication operations. The duration augmentation layer 316 outputs one or more masked segments (containing the features of the audio with the masked portions), and, in some cases, the features of the audio data from preceding layers and/or the features of the input audio signal.

The stat pooling layer 318 applies a particular statistical pooling technique (max pooling, average pooling) on the features of the audio data ingested from the duration augmentation layer 316, and in some instances performs additional convolutional operations. Notably, the statistical values calculated by the stat pooling layer 318 will result only from those unmasked features of the audio data after applying the duration augmentation layer 316. The stat pooling layer 318 may detect and/or evaluate the features of the audio data to identify prominent features. In some cases, the pooling layer 318 reduces the dimensionality of the features for more efficient operations in later layers of the neural network 300. The stat pooling layer 318 extracts any number of statistical features from the ingested data. As an example, a max-pooling layer detects the prominent features having higher relative values in a pooling window comprising a set of values. As another example, an average-pooling layer detects the relatively average features according to operations used for statistical averaging (e.g., mean, standard deviation).

The fully connected layers 320 perform various weighted operations on the results ingested from the stat pooling layer 318 to generate a feature vector (e.g., training feature vector, enrollment feature vector, training feature vector) for the inputted audio signal. The operations of the fully connected layers 320 perform the weighted algorithmic operations to determine the feature vector for the input audio signal and likelihood score that the generated feature vector indicates similarity with another feature vector.

At training time, the neural network 300 receives input audio signals for thousands or millions of speech samples, along with randomly generated speech samples or labels. The classification layer 322 compares the training feature vectors against the feature vectors of the generated speech samples or the speech samples associated with a label.

Training continues until the training feature vectors converge with the expected feature vectors to an adequate level of error. In particular, the classification layer 322 generates and evaluates the similarity score indicating the distance between the training feature vector and known speech samples (e.g., randomly generated speech samples, labeled dataset). The classification layer 322 will adjust the hyper-parameters of the neural network 300 until no further adjustments are required and there is minimal error with high success rates. The server ordinarily disables the classification layer 322 after the training phase, thereby fixing the hyper-parameters.

At enrollment, the neural network 300 receives several enrollee speech samples (known to originate from the enrollee). The fully-connected layers 320 output enrollee feature vectors for each of these several enrollment vectors (sometimes called "embeddings"), which the fully-connected layers 320 average together or otherwise algorithmically combine into the enrollee feature vector referenced during the deployment phase.

In some embodiments, the fully connected layers 320 may adjust various algorithmic weights to reduce the level of error between the enrollee feature vector and one or more enrollee speech samples.

During the deployment phase, the fully connected layers 320 generate the test speaker feature vector for the speaker in the input audio signal. The fully connected layers 320 algorithmically compares speaker feature vector against one or more enrollee feature vectors. In some cases, the fully connected layers 320 output a likelihood score indicating the likelihood of a match between speaker feature vector and the enrollee feature vector. The server may determine that the speaker is the enrollee if the likelihood score satisfies a threshold score. This determination of match or failed match, or the likelihood score, used in any number of downstream audio processing operations, such as speech recognition, audio event detection, voice activity detection, and voice spoofing detection, among others.

EXAMPLE IMPLEMENTATIONS

Speaker Identification

An implementation of the neural network may include speaker identification, where a server executing a neural network as described herein recognizes fraudsters by their voice. The server may build a Fraudster's Profile and Fraudster Identification. When building the profile, when a call center agent or other user tags a speaker as a fraudster, the server will find all fraud calls associated with this Fraudster according to certain identifying information in the signaling data, and extract corresponding speaker embeddings using the end-to-end speaker neural network described herein, by enabling or disabling in-network augmentation. The server creates the fraudster's voiceprint by averaging the embeddings.

In fraudster identification, for each new call the server extracts a speaker embedding (e.g., test feature vector) using the end-to-end neural network architecture by disabling in-network augmentation. The server computes the similarity score between this speaker embedding and the set of fraudsters' voiceprints (e.g., enrollee feature vectors), and retain only the maximum similarity score. If the maximum score is higher than a predefined threshold, the call is a fraud call and the server will automatically alert the user or take another remedial measure. If the maximum score is below the threshold, the call is likely a genuine call.

Speaker Verification

Speaker verification could be used for call centers to verify a caller-speaker is who they purport using the caller's voice. During enrollment, the server will record a few seconds of free speech or prompted texts from an enrollee. This could happen passively or actively, and for several instances. Once the enrollment utterances are captured, the server will extract corresponding enrollee embeddings using the neural network described herein by enabling or disabling certain in-network augmentation layers. The enrollee embeddings are then used to create a speaker's voiceprint and add it to a database of enrolled speakers (enrollees).

At verification time, when the server receives a new utterance, the server will extract a speaker embedding (test feature vector) using the neural network by disabling in-network augmentation layers, and compute the similarity score between this embedding and the set of claimed Speaker's Voiceprint. If a maximum similarity score is higher than a predefined threshold, the caller-speaker is verified to be the enrollee. If the score is below the threshold, then the call is denied access.

Speaker Voice Clustering

Voice clustering aims at grouping unlabeled speech utterances into clusters where each cluster of utterances originates from the same speaker. The server accesses a full set of utterances in a database corpus and/or adds new utterances on the fly. The similarity between two utterances represents the similarity scores based on the differences between the speaker embeddings of those utterances.

For each utterance, the server extracts a speaker embedding (e.g., feature vector) using the neural network by disabling in-network augmentation layers. If the server has access to the full set of utterances, then the server applies a hierarchical, bottom-up clustering. The server will compute a similarity matrix using the embeddings, where the matrix includes each pair of clusters (that all begin with an utterance size of 1), and then starts iteratively merging the most similar pairs of clusters until a predefined threshold is met.

If the system is receiving utterances on the fly, the server may apply a sequential clustering algorithm. The server can only compute the similarity between the incoming utterance and existing clusters. As such, if the maximum similarity score is higher than a predefined threshold, then server will merge the incoming utterance with the cluster that has the maximum similarity score. Otherwise, the system will create a new cluster.

Speaker Diarization

Speaker diarization aims to answer the question of "who speaks when?" in an audio recording. A server performing a speaker diarization operation may apply the neural network described herein to improve speaker diarization. For ease of description, the training and enrollment phases have been completed as mentioned in one or more embodiments described above. During deployment, the server parses an audio recording is into frames of x seconds (e.g. x=2 seconds). For each segment, the server extracts a speaker embedding using the neural network by disabling in-network augmentation. The server may apply a clustering algorithm to the speaker embeddings extracted from the frames, such that the server assigns each segment to the most probable speaker cluster. The server may execute an optional regimentation operation to re-adjust the boundaries of labeled segments.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    training, by a computer, a neural network comprising one or more in-network augmentation layers by applying the neural network on a plurality of training audio signals, thereby resulting in a trained neural network;
    disabling, by the computer, a classification layer of the neural network, thereby resulting in a disabled classification layer of the trained neural network;
    generating, by the computer, an enrollment vector for an enrollee by applying the trained neural network on a plurality of enrollment audio signals of the enrollee;
    receiving, by the computer, a test input audio signal of a speaker; generating, by the computer, a speaker vector for the speaker by applying the trained neural network on the test input audio signal; and
    generating, by the computer, a likelihood score for the speaker indicating a likelihood that the speaker is the enrollee based upon the speaker vector and the enrollment vector.

2. The method according to claim 1, further comprising identifying, by the computer, the speaker is the enrollee in response to determining that the likelihood score satisfies a similarity threshold.

3. The method according to claim 1, wherein the one or more in-network augmentation layers include at least one of: a noise augmentation layer, a frequency augmentation layer, a duration augmentation layer, and an audio clipping layer.

4. The method according to claim 1, further comprising disabling, by the computer, at least one of the in-network augmentation layers of the trained neural network during a deployment phase.

5. The method according to claim 1, wherein the trained neural network includes fixed hyper-parameters.

6. The method according to claim 1, wherein the computer iteratively applies the neural network on the plurality of training audio signals during two or more stages of a training phase.

7. The method according to claim 1, wherein the one or more in- network augmentation layers include a noise augmentation layer, and wherein applying the neural network further comprises:
    obtaining, by the computer, one or more noise audio samples including one or more types of noise; and
    generating, by the computer, one or more simulated noise samples for an input signal by applying the noise augmentation layer on the one or more noise samples and the input signal, wherein the input signal is one of a training audio signal, an enrollment audio signal, and the test input audio signal,
    wherein a subsequent layer of the neural network is applied using the one or more simulated noise samples and the input signal.

8. The method according to claim 1, wherein the one or more in- network augmentation layers include a frequency augmentation layer, and wherein applying the neural network further comprises:
- selecting, by the computer, a band of frequencies from a frequency domain representing an input signal, wherein the input signal is one of a training audio signal, an enrollment audio signal, and the test input audio signal; and
- generating, by the computer, frequency-masked data for the input signal by applying a mask on the input signal according to the band of frequencies,
- wherein a subsequent layer of the neural network is applied using the frequency-masked data for the input signal.

9. The method according to claim 1, wherein the one or more in-network augmentation layers include a duration augmentation layer, and wherein applying the neural network further comprises:
- selecting, by the computer, one or more speech segments of an input signal, each respective speech segment having a fixed duration and occurring at a random time in the input signal, wherein the input signal is one of a training audio signal, an enrollment audio signal, and the test input audio signal; and
- for each speech segment, generating, by the computer, a time-masked segment by applying a mask to the input signal according to the fixed duration and the random time of the respective speech segment,
- wherein a subsequent layer of the neural network is applied using the one or more time-masked segments.

10. The method according to claim 1, wherein the one or more in-network augmentation layers include an audio clipping layer, and wherein applying the neural network further comprises:
- selecting, by the computer, a segment of an input signal having a random duration and occurring at a random time of the input signal, wherein the input signal is one of a training audio signal, an enrollment audio signal, and the test input audio signal; and
- generating, by the computer, a clipped segment by setting energy values of the segment at a highest energy value or a lowest energy value,
- wherein a subsequent layer of the neural network is applied using the clipped segment.

11. A system comprising:
- a computer comprising a processor and a non-transitory computer readable medium having instructions that when executed by the processor are configured to:
- train a neural network comprising one or more in-network augmentation layers by applying the neural network on a plurality of training audio signals, thereby resulting in a trained neural network;
- disable a classification layer of the neural network, thereby resulting in a disabled classification layer of the trained neural network;
- generate an enrollment vector for an enrollee by applying the trained neural network on a plurality of enrollment audio signals of the enrollee;
- receive a test input audio signal of a speaker;
- generate a speaker vector for the speaker by applying the trained neural network on the test input audio signal; and
- generate a likelihood score for the speaker indicating a likelihood that the speaker is the enrollee based upon the speaker vector and the enrollment vector.

12. The system according to claim 11, wherein the computer is further configured to identify the speaker is the enrollee in response to determining that the likelihood score satisfies a similarity threshold.

13. The system according to claim 11, wherein the one or more in-network augmentation layers include at least one of: a noise augmentation layer, a frequency augmentation layer, a duration augmentation layer, and an audio clipping layer.

14. The system according to claim 11, wherein the computer is further configured to disable at least one of the in-network augmentation layers of the trained neural network during a deployment phase.

15. The system according to claim 11, wherein the trained neural network includes fixed hyper-parameters.

16. The system according to claim 11, wherein the computer iteratively applies the neural network on the plurality of training audio signals during two or more stages of a training phase.

17. The system according to claim 11, wherein the one or more in-network augmentation layers include a noise augmentation layer, and wherein the computer is further configured to:
- obtain one or more noise audio samples including one or more types of noise; and
- generate one or more simulated noise samples for an input signal by applying the noise augmentation layer on the one or more noise samples and the input signal, wherein the input signal is one of a training audio signal, an enrollment audio signal, and the test input audio signal,
  - wherein a subsequent layer of the neural network is applied using the one or more simulated noise samples and the input signal.

18. The system according to claim 11, wherein the one or more in-network augmentation layers include a frequency augmentation layer, and wherein the computer is further configured to:
- select a band of frequencies from a frequency domain representing an input signal, wherein the input signal is one of a training audio signal, an enrollment audio signal, and the test input audio signal; and
- generate frequency-masked data for the input signal by applying a mask on the input signal according to the band of frequencies,
  - wherein a subsequent layer of the neural network is applied using the frequency-masked data for the input signal.

19. The system according to claim 11, wherein the one or more in-network augmentation layers include a duration augmentation layer, and wherein the computer is further configured to:
- select one or more speech segments of an input signal, each respective speech segment having a fixed duration and occurring at a random time in the input signal, wherein the input signal is one of a training audio signal, an enrollment audio signal, and the test input audio signal; and
- for each speech segment: generate a time-masked segment by applying a mask to the input signal according to the fixed duration and the random time of the respective speech segment,
  - wherein a subsequent layer of the neural network is applied using the one or more time-masked segments.

20. The system according to claim 11, wherein the one or more in-network augmentation layers include an audio clipping layer, and wherein the computer is further configured to:

select a segment of an input signal having a random duration and occurring at a random time of the input signal, wherein the input signal is one of a training audio signal, an enrollment audio signal, and the test input audio signal; and
generate a clipped segment by setting energy values of the segment at a highest energy value or a lowest energy value,
  wherein a subsequent layer of the neural network is applied using the clipped segment.

* * * * *